Aug. 14, 1951

J. K. BROWN 2,564,151

INTERCONNECTION SYSTEM

Filed June 16, 1947

4 Sheets-Sheet 1

J. K. BROWN
*INVENTOR.*

BY John R. Faulkner

ATTORNEY.

Aug. 14, 1951 J. K. BROWN 2,564,151

INTERCONNECTION SYSTEM

Filed June 16, 1947 4 Sheets-Sheet 2

J. K. BROWN
*INVENTOR.*

BY

ATTORNEY

Aug. 14, 1951

J. K. BROWN

INTERCONNECTION SYSTEM 2,564,151

Filed June 16, 1947

4 Sheets-Sheet 3

J. K. BROWN
*INVENTOR.*

BY John R. Faulkner

ATTORNEY

Aug. 14, 1951
J. K. BROWN
2,564,151
INTERCONNECTION SYSTEM
Filed June 16, 1947
4 Sheets-Sheet 4

J. K. BROWN
INVENTOR.
BY John R. Faulkner
ATTORNEY

Patented Aug. 14, 1951

2,564,151

UNITED STATES PATENT OFFICE 2,564,151

INTERCONNECTION SYSTEM

John K. Brown, Detroit, Mich.

Application June 16, 1947, Serial No. 754,955

10 Claims. (Cl. 235—61.6)

This invention relates generally to interconnection systems, and more particularly to interconnection systems utilizing electrical means for controlling the transfer of data in mechanically actuated punched card tabulating equipment.

For a better understanding of the present invention, reference is first made to my copending application Serial No. 663,323, entitled "Interconnection Systems," now abandoned. The present application and the above-mentioned copending application provide different solutions for the same general problem, and accordingly the detailed discussion of this problem and many of the general objects of the invention as stated in the said copending application are applicable to the present invention and are incorporated in this application by reference. Briefly, the problem is to provide an interconnection system for punched card tabulating equipment which will enable a variety of functions to be performed and in which data of practically any arrangement, sequence or distance apart may be printed on the printed page irregardless of the arrangement, sequence or distance apart of the data on the punched card. Heretofore it has been necessary to provide interchangeable wiring units to effect the desired allocation of the sensed data on the printed record. These wiring units are so constructed that alterations thereto cannot be made by the user, and hence their flexibility is restricted.

As in my copending application, it is a principal object of the invention to eliminate the necessity of providing each user of tabulating equipment with a number of wiring units to meet various accounting problems, since the present necessity of using many different wiring units is not only costly but time consuming. It is proposed to accomplish this by providing a combination electrical and mechanical interconnection system between the sensing mechanism and the operational mechanism which will provide complete flexibility and which will permit the operator to select the desired arrangement and sequence of the transmitted data and to quickly and easily make the required changes in this arrangement and sequence without providing costly wiring units for each job.

Another object of this invention is to retain the advantages of mechanical punched card tabulating equipment which is positive in operation and at the same time to provide the flexibility of operation which can be achieved electrically. It is thus possible to retain the greater data capacity of mechanical equipment as well as the ability to sense each specific hole in each card column. In present electrical equipment sensing is accomplished by a brushing contact and therefore generally is restricted to a single digit or character from each card column. Electrical equipment, of course, readily lends itself to complete flexibility and simple interchange of arrangements by means of switchboards. By thus combining the advantageous features of each general system, a construction is obtained which is far superior to either.

Still another object of the present invention is to utilize mechanical sensing equipment to control electrical circuits which in turn control the operation of other mechanical units arranged to actuate the operational equipment. A further object is to provide such a construction which may be incorporated in present mechanical actuated punched card tabulating equipment with a minimum of changes, and to retain without change a large portion of the presently designed equipment. The design is such that it can be engineered to meet existing space requirements to simplify the problem of changing over present equipment to utilize the present invention. Provision is also made for readily removing portions of the electrical part of the system for possible maintenance purposes.

In one embodiment of the invention, the projection of sensing pins through holes in punched cards precludes the closing of electrical circuits and thus renders solenoids inoperative and permits the mechanical transmission of data, while at the same time circuits are closed by sensing pins which do not project through holes in the punched card resulting in energizing certain other solenoids and effectively preventing the mechanical urge of those pins whose operation is to be nullified.

The invention utilizes the basic principle common generally to all such equipment, in that all card sensing pins are projected upward to the punched card, but only the impulses of those pins which encounter no resistance and pass through card holes are unrestricted. With the present invention, however, the mechanical impulse which actuates the recording mechanisms of the tabulator is not initiated by the lift of the card sensing pin box but rather by the lift of the pin box whose pins are urged against the base of solenoid controlled pins. Thus the machine trys to urge every one of these pins upwardly but, whereas the resistance to certain of these pin impulses was originally imposed by the unpunched portions of the card, the resistance is now imposed by those solenoids which are energized. The only function of the lift of the lower or card sensing pin box (except for certain total controls, etc.) is to complete electrical circuits which control the solenoids. If desired, the functions of the total controls could be engineered into a pin box located above the solenoid box, so that the lift of the card sensing pin box could be greatly reduced since the only requirement would be that an electrical circuit be open for every card hole and closed for every unpunched card position.

It is thus an important object of the invention to provide a machine which is mechanically operated and in which a solenoid application is used to completely dampen those mechanical impulses not essential in the determination of the required result. This arrangement secures complete flexibility since any hole in the punched card may cause any solenoid or group of solenoids to remain unenergized and thereby permit the mechanical urge of the corresponding pins to motivate the selected tabulator functions to be uninterrupted.

In an alternate embodiment of the invention, the general arrangement may be reversed and circuits made and actuating solenoids energized by the projection of sensing pins through holes in the punched cards.

Many other objects and advantages of the present invention will be made more apparent as this description proceeds, particularly when considered in connection with the accompanying drawings, wherein.

Figure 1:
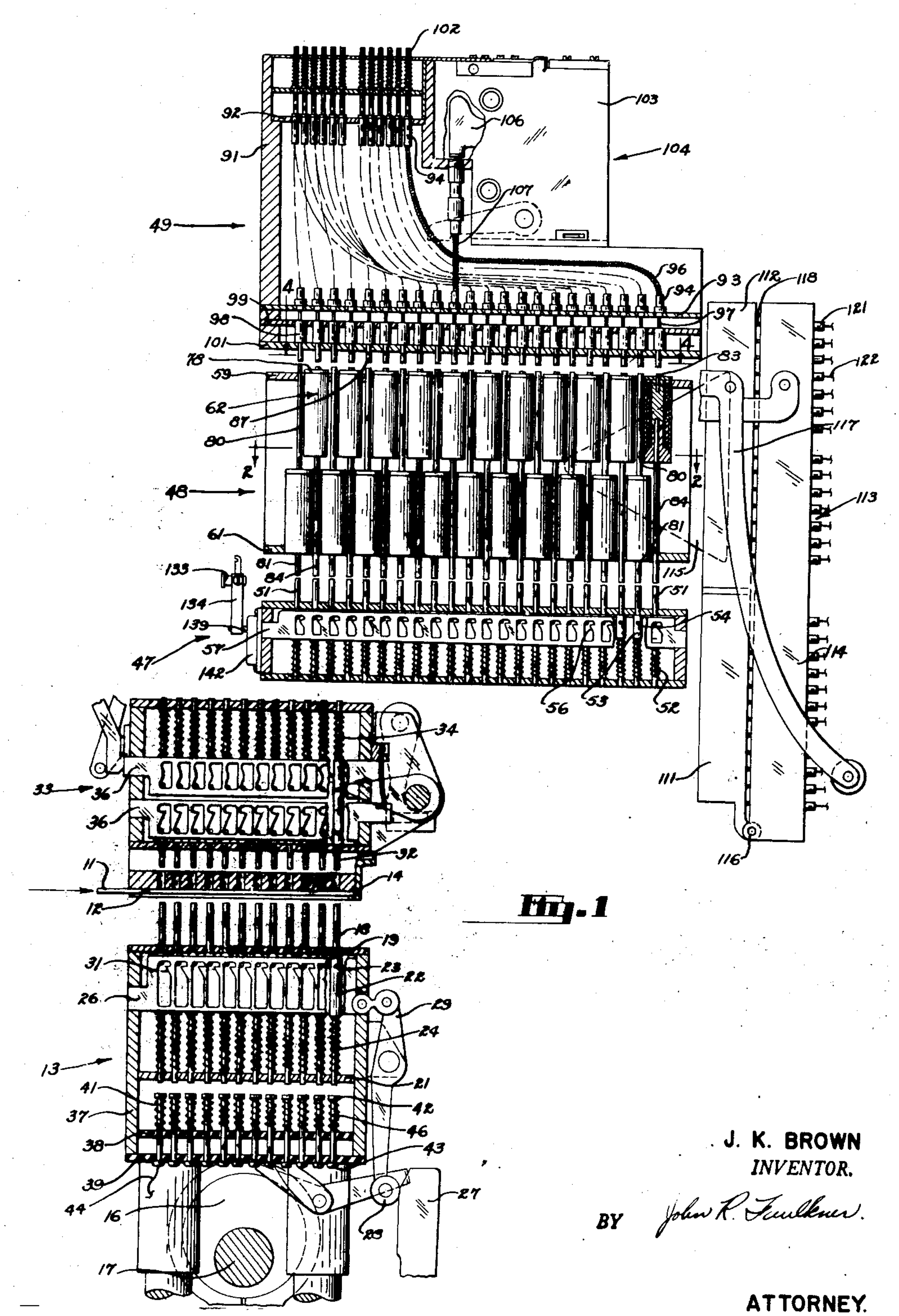
Figure 1 is a semi-diagrammatical vertical sectional elevation of tabulating equipment embodying the present invention.

Referring now more particularly to the drawings, and particularly to Figure 1, it will be noted that I have illustrated and described the invention as applied to an alphabetic tabulator, although obviously the invention may be applied to other equipment as well. As illustrated, the device as applied to the tabulator consists of three sections, namely, the base section, the head section, and the switchboard and control panel section carried by the head section.

The base section includes generally the card feeding mechanism (not shown), the sensing mechanism or lower pin box for analyzing the punched cards, and the control mechanism or middle pin box. These units are mounted in the tabulator frame. The head section of the machine includes mechanism initiating mechanical movements which subsequently operate the desired accounting and printing mechanism (not shown) as well as electrical means controlling the operation of the mechanically actuated pins. The switchboard and control panel section is carried by the head section and affords flexibility for the machine in that it permits any desired interconnections to be made between the base section and the head section.

SENSING MECHANISM 13

The card feeding mechanism (not shown) and the sensing mechanism shown in connection with the present invention are generally the same as those now in general use in business machines of the mechanically actuated punched card type. Referring to Figure 1, cards 11 are fed serially from a conventional card magazine (not shown) into a card chamber 12 located above a sensing pin box indicated generally at 13. The card is accurately positioned in the card chamber by means of a stop 14. While in its arrested position the card 11, which has a number of holes punched therein indicating certain data or information, is sensed by means of the sensing pins in the lower pin box 13, the latter being reciprocated under the control of an eccentric disc 16 mounted upon the main drive shaft 17.

The lower pin box 13 contains a plurality of pins 18 mounted for vertical reciprocation in holes formed in guide plates 19 and 21. In the present machine there are 540 such sensing pins arranged in rows of columns in accordance with conventional practice. Each of the pins 18 has an enlarged and flat portion 22 intermediate its ends, and an extrusion or tab 23 projects radially outwardly from the enlarged portion 22 of each pin. The lower portion of each pin is encased by a coil spring 24 positioned between the enlargement 22 of the pin and the lower guide plate 21 and functioning to urge the pin upwardly.

The initial urge imparted to the pins 18 by the vertical motion of the lower pin box 13 lifts the pins into engagement with the punched card 11. Certain of the pins will, of course, project through the holes in the card, while those encountering the resistance of the card will be moved downwardly in the pin box 13, this being permitted by the compression of the coil springs 24. As this action is completed, a locking bar 26, which is mounted in the pin box 13 for lateral sliding movement, is shifted laterally by actuating mechanism including the cam 27, cam follower 28 and connecting linkage 29. Projections 31 on the locking bar are moved under the extrusions on the lifted pins (which have projected through holes in the card), and over the extrusions on the lowered pins (which have encountered the resistance of the cards). The vertical movement of the lower pin box 13 is continued but it will be seen that the subsequent pressure upon the pins projecting through the cards is now exerted positively by the locking bars rather than merely by reason of the resistance to compression of the springs 24.

CONTROL MECHANISM 33

After the locking bars 26 are in position under the pin extrusions 23, the sensing pins 18 meet set pins 32 which are mounted for vertical reciprocation in a middle pin box 33 (nominally in conventional constructions called the "upper" pin box). These pins are in vertical alignment with the sensing pins 18, and are normally held in their depressed positions by means of springs 34. The positive vertical movement of the sensing pins 18 which project through holes in the punched card raise the corresponding set pins 32, which are then locked in their elevated positions by lateral movement of the slides 36. Certain controlling mechanisms are thereby operated, and the pins are retained in their elevated positions until just prior to the engagement of pins 32 by pins 18 in the succeeding cycle, at which time this retention is released.

In the conventional type of mechanically actuated punched card machine, these set pins 34 also mechanically engage an assembly of Bowden wires contained in the conventional wiring unit and transmit mechanical impulses therethrough. In the present construction, however, this wiring unit is eliminated, and the sensed impulses result in preventing the energizing of certain solenoids thus permitting the urge initiated by the top pin box to actuate the Bowden wires and the accounting and printing mechanism.

ELECTRICAL CONTACTS OF SENSING UNIT 13

It will be seen in Figure 1 that the frame 37 of the sensing or lower pin box 13 extends downwardly below the lower ends of the sensing pins 18 and supports a pair of vertically spaced horizontal guide plates 38 and 39. These guide plates are constructed of non-conducting material. A plurality of contact pins 41, corresponding in number and in arrangement to the sensing pins 18, are mounted for vertical reciprocation in holes formed in the guide plates 38 and 39. Each of these pins is formed with an enlarged upper contact head 42, and also with an enlarged lower head 43 which serves as a stop to arrest upward movement of the pin and to which an electrical wire 44 in attached. A coil spring 46 encircles each contact pin 41 between its enlarged head 42 and the guide plate 38, and normally urges the pin upwardly to the position shown in Figure 1. Although the operation of the mechanism will be described more in detail hereinafter, it may be pointed out at this time that the guide plate 21 of the sensing pin box 13 is grounded, and that when the lower pin box 13 is raised, those sensing pins 18 which encounter the resistance of the punched card and do not project through holes therein will make electrical contacts with the contacts heads 42 of the corresponding contact pins 41.

It will be seen that the construction thus far described is substantially conventional except that the wiring unit normally positioned above and engaged by the set pins 34 has been eliminated, and a plurality of electrical contact pins 41 have been added to the sensing pin box 13.

*Head section*

The head section of the mechanism, which comprises the top pin box 47, the solenoid box 48, and the Bowden wire assembly 49, will next be described. These units are new, and have been particularly designed to occupy the space presently occupied in existing equipment by the wiring unit. This enables existing equipment to be utilized without major modification and thus enables the advantages of the present invention to be secured by owners of present mechanically actuated machines. These units are suitably mounted in the tabulator frame in the relative positions shown in Figure 1.

*Top pin box 47*

This pin box is an expanded version of the sensing or lower pin box 13 and is quite similar in construction except that it contains 660 pins arranged in rows of 22 each. The pins 51 of this pin box are spring urged upwardly by means of springs 52 and have enlarged portions 53 carrying extrusions 54 adapted to fit beneath projections 56 formed on the locking bar 57. The pin box 47 is adapted to be reciprocated vertically under the actuation of the main drive-shaft 17 through suitable mechanical connections (not shown). In addition, the locking bar 57 of the upper pin box is adapted to be laterally shifted in timed relation to the reciprocation of the pin box by means of suitable cam mechanism corresponding generally in construction to the cam mechanism of the sensing pin box.

*Solenoid box 48*

Figure 2:
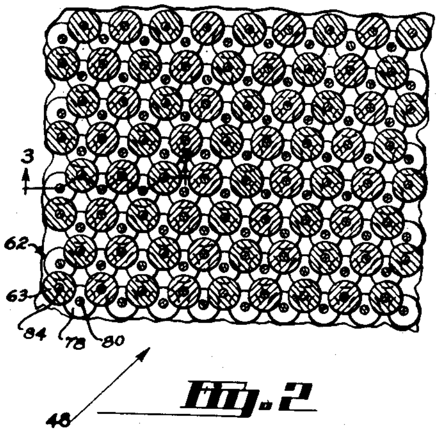
Figure 2 is an enlarged fragmentary horizontal cross sectional view taken through the solenoid box substantially on the plane indicated by the line 2—2 of Figure 1.
Figure 3:
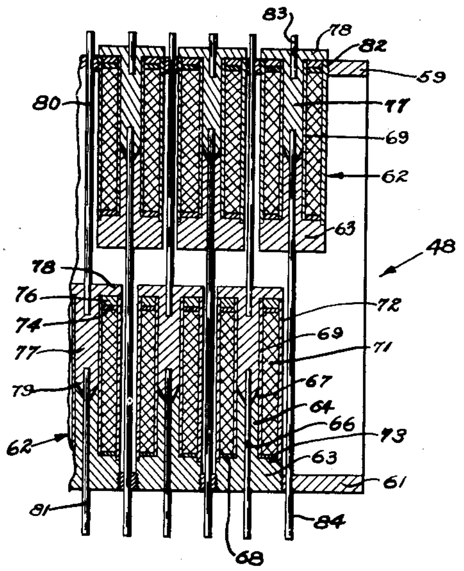
Figure 3 is a vertical cross sectional view on an enlarged scale taken substantially on the plane indicated by the line 3—3 of Figure 2, illustrating in detail the solenoids in the upper and lower tiers.

For a complete understanding of the solenoid box 48, which is positioned directly above the upper pin box 47, reference is made not only to Figure 1 but also to Figures 2 and 3. The frame of the solenoid box 48 is slidably mounted in the tabulator frame so that it may be readily removed for service purposes. The solenoid box frame comprises vertically spaced upper and lower supporting plates 59 and 61 which support, in the present instance, 660 solenoid units 62 arranged in upper and lower tiers of 330 solenoids each. The arrangement of the solenoids in two tiers permits this number of solenoids to be mounted within a relatively small space and enables the required electrical control to be provided within existing space requirements. The solenoids 62 in the upper and lower tiers are generally similar, and for simplicity one of the lower solenoids 62 will first be described in detail, and the differences between the solenoids in the upper and lower tiers will then be pointed out.

Each solenoid is mounted upon a cylindrical soft steel base 63, see Figure 3, the lower portion of which is externally threaded into a tapped hole in the lower plate 61 of the solenoid box. The base 63 has an integral plug portion 64 and a bore 66 extends vertically therethrough, the upper portion of the bore being flared outwardly to form a cone shaped recess 67. A fiber washer 68 fits over the plug portion 64 and rests upon the shoulder formed between the base and the plug portion thereof. The assembly next includes a brass tube 69 which is preferably a press fit upon the plug portion of the base.

The winding 71 fits over the tube 69 and is enclosed by a larger soft steel tube 72, the lower portion of which is seated upon a shoulder 73 formed in the base 63. The upper end of the assembly is closed by a fiber washer 74 and by a soft steel cap 76 which is a press fit upon the exterior of the brass tube 69 and within the interior of the soft steel tube 72.

The reciprocable armature of the solenoid comprises a soft steel plug 77 integrally formed with an enlarged upper flange 78 and a cone shaped portion 79 at its lower edge. The body of the plug 77 is a sliding fit in the brass tube 69 and the cone shaped lower end 79 of the plug is adapted to engage the cone shaped recess 67 formed at the upper end of the bore 66 extending through the base 63. In this position the top flange 78 is adjacent the steel cap 76.

Upper and lower brass rods 80 and 81 extend into and are secured in axial bores formed in opposite ends of the plug 77. The upper rod 80 is relatively long and extends through an aligned hole formed in the upper plate 59 of the solenoid box, while the lower rod 81 is shorter, and extends through the bore 66 in the base of the solenoid and projects a predetermined distance below the lower plate 61 of the solenoid box. The construction of the solenoid and its winding is such that when energized the solenoids tend to hold the armature 77 in its lower position as seen in Figure 3. When, on the other hand, the solenoid is not energized, the armature 77 and the rods 80 and 81 are free to be moved upwardly under the impulse of the pins 51 carried by the vertically reciprocable top pin box 47.

With attention now being directed to the solenoids 62 comprising the upper tier in the solenoid box, see Figure 3, it will be noted that these solenoids are generally identical to those in the lower tier with a few differences in construction necessary to mount them in the upper plate 59. To accomplish this, the upper end of the shell or tube 72 is externally threaded for engagement with a tapped hole 82 in the upper plate 59 and the threads are omitted from the external surface of the base 63. The plug or armature 77 is identical, and its upper flange 78 is normally positioned above the upper plate 59, as shown in Figure 3. The only other difference in construction is that the length of the upper and lower rods carried by the armature 77 are changed, in that the upper rods 83 are relatively short while the lower rods 84 are relatively long. The arrangement is such that the upper rods 80 and 83 project equal distances above the upper plate 59 of the solenoid box while the lower rods 81 and 84 project equal distances below the lower plate 61. It will also be seen that the upper rods 80 of the lower solenoid and the lower rods 84 of the upper solenoid pass freely through the spaces between adjacent solenoids in the respective tiers.

The arrangement of the solenoids in the upper and lower tiers is best seen in Figure 2, in which it will be seen that the solenoids are arranged in suitable pattern so that those of the upper and lower tiers overlap each other and provide for positioning the maximum number of solenoids in a given space in the solenoid box, while at the same time providing room for the armature rods to project between the solenoids of the opposite tier. While it has been found that a double tier of solenoids satisfactorily meets the operating and space requirements of the present installation, it is within the contemplation of the invention to provide solenoid boxes having one or three or more tiers of solenoids suitably engaged.

To meet all possible requirements of the alphabetic tabulator, 660 solenoids have been provided, one for each of six pin positions in each of 100 tabulator sectors with 60 additional solenoids for naught-blocks, subtraction, total, and other control purposes.

Figure 4:
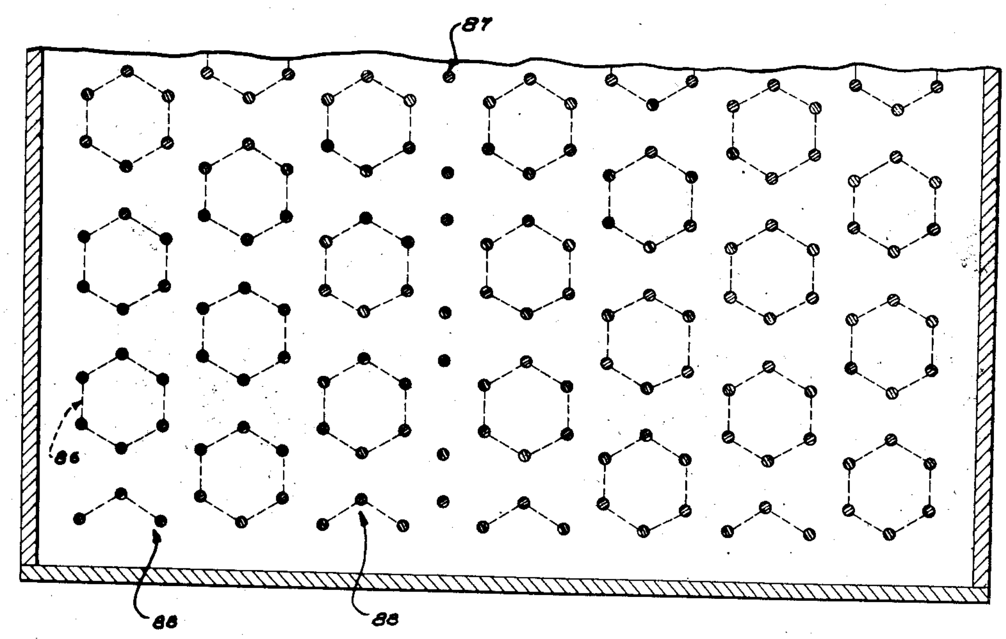
Figure 4 is a horizontal cross sectional view taken substantially on the plane indicated by the line 4—4 of Figure 1 and indicating diagrammatically the arrangement of the pins of the Bowden wire unit in groups of six.

Figure 4 illustrates the grouping of three upper tier solenoids and three lower tier solenoids to form a group of six to operate the six pin positions of a tabulator sector. These groups are indicated diagrammatically in Figure 4 by the reference character 86. It will be seen that in addition to the groups of six, one row of actuating pins 87 is arranged directly beneath the block operating mechanism, to be described later, and is so spaced as to provide direct control thereof. In addition, other odd pins 88 are assigned for miscellaneous controls.

*Bowden wire assembly 49*

The fixed Bowden wire assembly 49 is mounted in the tabulator frame, by bolts or other suitable means to permit removal for service purposes, directly above the solenoid box 48, and functions to transmit mechanically the mechanical urge of the armature rods from the solenoid box to the accounting and printing mechanism (not shown) above.

The Bowden wire assembly comprises a frame 91 including horizontal supporting plates 92 and 93. Ferrules 94 are mounted upon the plates and support Bowden wire assemblies 96 through which the motivating wires 97 extend. The lower ends of the wires 97 extend beneath the supporting plates 93 and into holes provided in actuating pins 98. The actuating pins 98 are reciprocably mounted in vertically spaced guide plates 99 and 101, the pins 98 being in axial alignment with the armature rods of the solenoids 62 so as to be actuated thereby. At their upper ends the wires 97 are arranged to actuate spring urged pins 102 which in turn are arranged in axial alignment with the corresponding mechanisms of the accounting and printing mechanism located above, and function to operate the latter.

For the purposes of the alphabetic tabulator, the frame 91 of the Bowden wire unit is designed to receive and removably support the frame 103 of a block operating unit 104. Conventional block operating levers 106 are pivotally mounted in the block operating unit and are arranged directly above the block operating Bowden wire assemblies 107 of the Bowden wire assembly 49. It will be noted that the block operating levers 106, the block operating Bowden wire assemblies 107, and the pins 87, Figure 4, of the solenoid box, are all arranged in vertical alignment for the most effective operation of the block operating unit. The arrangement of control solenoids 87 is such as to readily accommodate all of the control levers 106 which can possibly be arranged in the block operating unit.

*Switchboard and control panel section*

Figures 5, 6, 7, 9, 10:
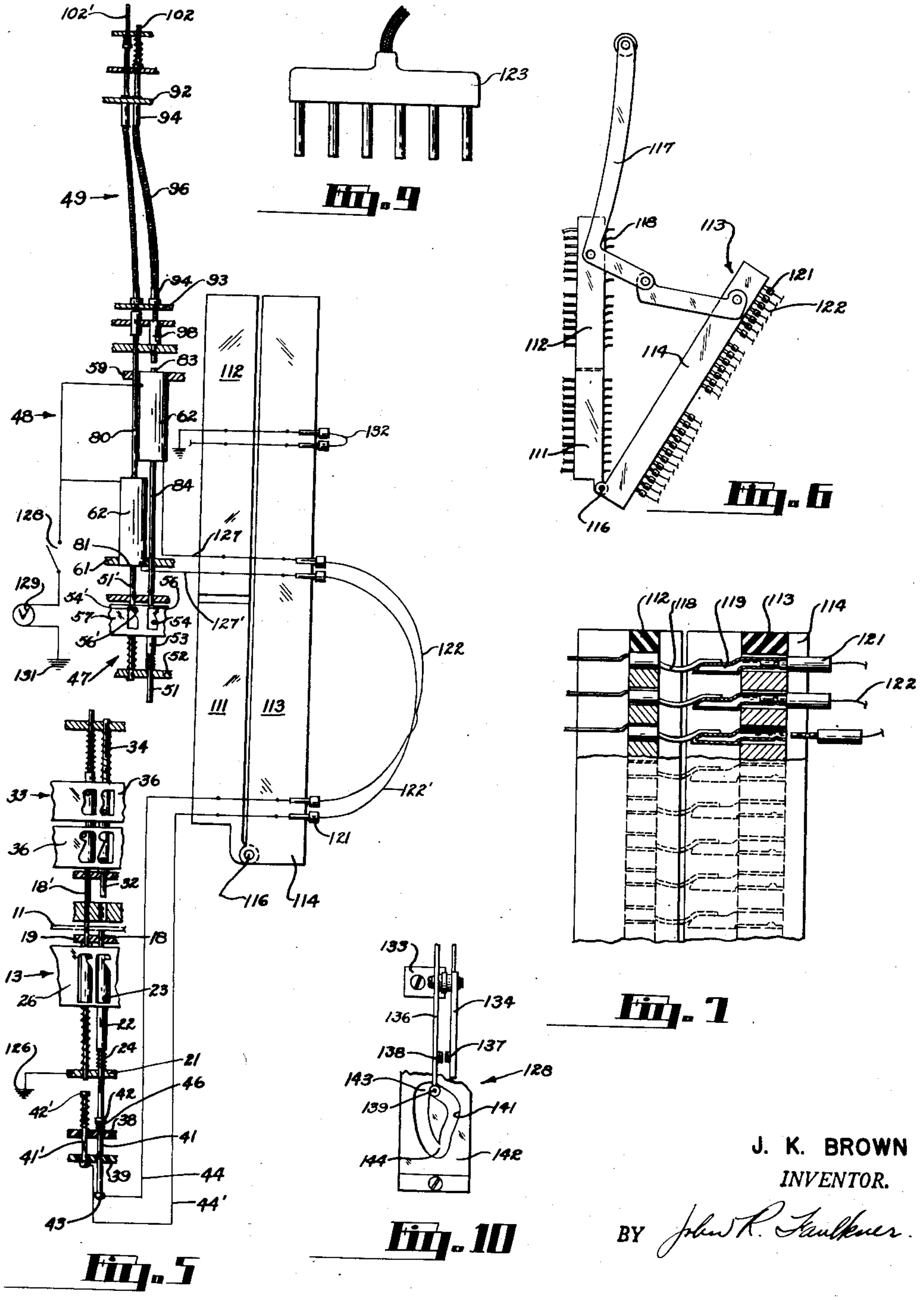
Figure 5 is a diagrammatical view of the system, including the electrical circuits, and illustrating different operating conditions in adjacent pins.
Figure 6 is a side elevation of the switchboards and the control panel with the control panel in open position.
Figure 7 is an enlarged fragmentary elevation, partly in section, of the upper portion of the solenoid switchboard and the control panel.
Figure 9 is an elevation of a multiple tip connector.
Figure 10 is an enlarged side elevation of the circuit breaker.

Attention is invited to the fact that there are no mechanical connections between the sensing mechanism and the top pin box 47 or the Bowden wire assembly 49. For complete flexibility of operation the connections therebetween are accomplished electrically through the sensing pin switchboard 111, the solenoid switchboard 112, and the control panel 113. The switchboard 112 is mounted upon the stationary solenoid box 48 by means of a bracket 115 while the switchboard 111 is suitably mounted upon the tabulator frame. As best seen in Figures 1, 6 and 7, the control panel 113 is slideably and removably mounted in a frame 114 pivotally connected at 116 to the lower end of the stationary switchboard 111. A conventional over-center locking device 117, shown closed in Figure 1 and open in Figure 6, can be easily manipulated to move the control panel to its closed position and to lock it in this position.

As best seen in Figure 7, the switchboards 111 and 112 and the control panel 113 carry cooperating spring type electrical contacts 118 and 119. The contacts 118 in the switchboard have soldered thereto wires leading to the solenoids 62 in the case of the switchboard 112 and to the contact pins 41 in the case of the switchboard 111. It will be noted that there are thus 540 contacts on the switchboard 111 corresponding to the number of sensing pins, and 660 contacts on the switchboard 112 corresponding to the number of solenoids.

Figures 8, 12:
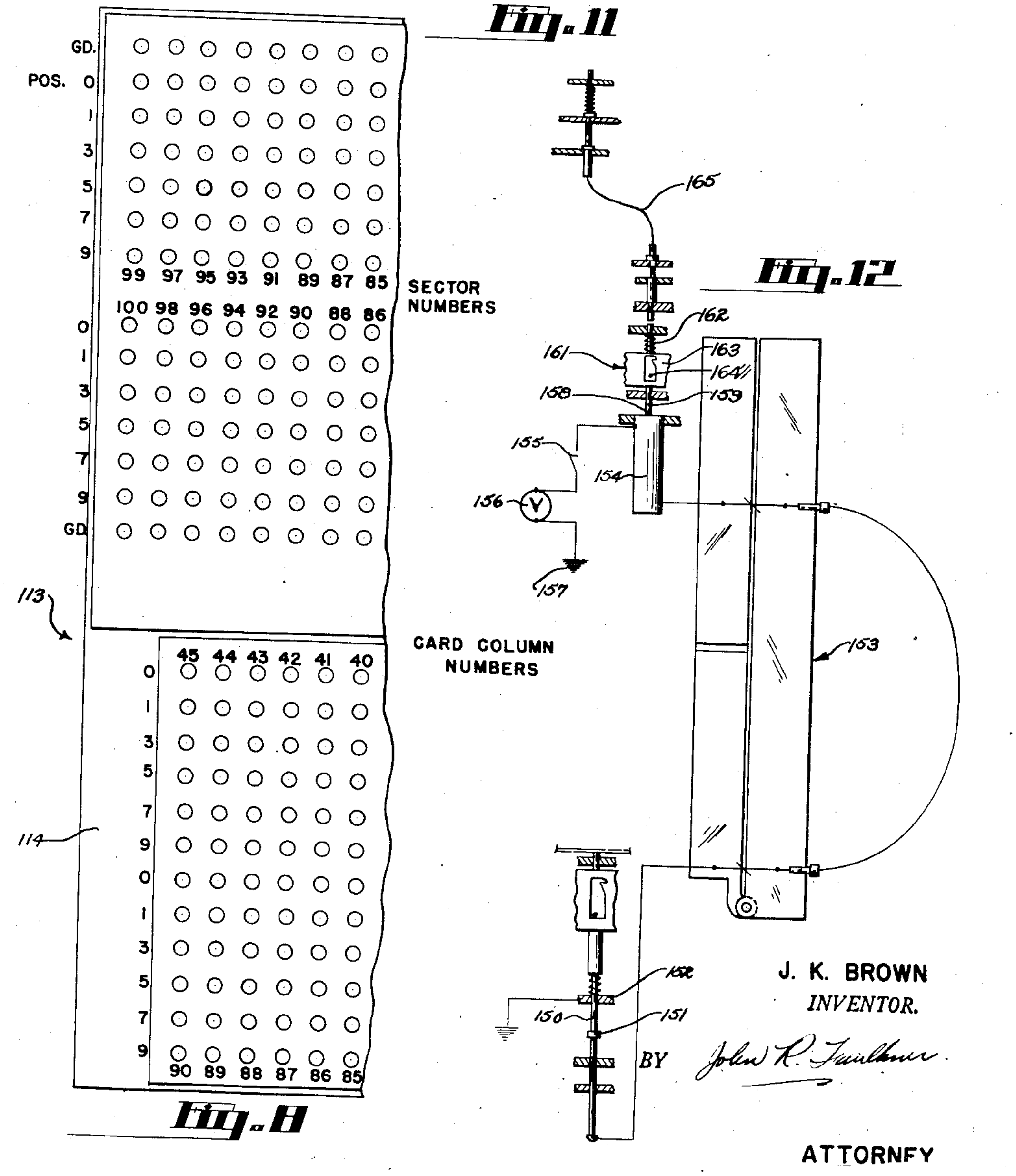
Figure 8 is a fragmentary front elevation of one end of the control panel.
Figure 12 is a diagrammatical view of an alternate system in which the electrical circuit and its operation is the reverse of the principal embodiment of the invention.

The electrical contacts or jacks 119 carried by the control panel are in the form of sockets for receiving plugs 121 of the phone tip type. Figure 8 illustrates a portion of the control panel, the socket positions shown in the upper portion being in alignment with the corresponding contacts in the solenoid switchboard 112, and the socket positions shown in the lower portion of the control panel being in alignment with the corresponding contacts in the sensing pin switchboard 111.

It will be seen from the foregoing that when the locking device 117 is operated to close the control panel 113 adjacent the switchboards, the aligned contacts 118 and 119 complete electrical circuits.

A plurality of connecting wires 122 equipped with plugs 121 at opposite ends are provided for the control panel and it will be apparent that the plug at one end of a wire may be plugged into a control panel socket or jack leading to any desired sensing pin contact, and at the same time have the plug at its opposite end plugged into a socket leading to any desired solenoid position. Thus it is possible by simple manipulation of the wires 122 to easily obtain any desired interconnection between the sensing mechanism and the operational mechanism so that any desired function may be performed and so that complete flexibility may be had. For certain fixed and repetitive jobs suitable prewired control panels may be used which may readily be slipped into place when needed. For certain other jobs, such as non-repetitive jobs, control panels may be provided which may readily and easily be altered by the user to fit his particular requirements.

In addition, this arrangement also facilitates the performance of functions currently performed by mechanical Y-wire and Y-wire inverts, since electrically such a connection presents no problem as compared to a similar connection in a mechanical system. Present construction is limited to four or five-way distribution, but with the present invention the distribution is practically unlimited. For example, a multiple tip connector 123 such as shown in Figure 9 can be used where desired to connect a single position on one switchboard to a group of positions on the other switchboard.

*Electrical circuit*

Reference is particularly made to the wiring diagram shown in Figure 5 for an understanding of the electrical circuit. This diagram illustrates two complete sets of pins in the sensing mechanism, top pin box, solenoid box, and Bowden wire assembly, with each set of pins illustrating a different operating condition. For example, when the sensing pin box 13 is raised as hereinbefore described, sensing pin 18 is resisted by the card 11, resulting in compressing the spring 24 and effecting and maintaining an electrical contact between the pin 18 and the contact head 42 of the corresponding contact pin 41. On the other hand, the adjacent sensing pin 18′ is shown in alignment with a punched hole in the card 11 and is consequently projected therethrough. Consequently contact is broken between the pin 18′ and the contact head 42′ of the contact pin 41′, opening the corresponding electrical circuit.

To complete an electrical circuit when the sensing pin is resisted by the card, the guide plate 21 of the sensing pin box 13 is grounded as at 126. The lead wires 44 and 44′ from the contact pins 41 and 41′ respectively lead to the sensing pin switchboard 111 through which contact is made as previously described to the control panel 113. The circuit is continued by wires 122 and 122′ which interconnect the desired contact positions in the upper and lower portions of the control panel. The circuits then continue through wires 127 and 127′ respectively to adjacent solenoids 62 in the upper and lower tiers respectively in the solenoid box. The opposite ends of the winding 71 of the adjacent solenoids are joined and lead to a circuit breaker 128 which in turn is connected to one side of the power supply 129. The opposite side of the power supply is grounded at 131.

From the foregoing it will be seen that the closed electrical circuit resulting from the resistance afforded by the card 11 to the sensing pin 18 results in energizing the corresponding solenoid 62 so that its lower armature rod 84 resists upward movement by the upper pin box 47. Thus, when the upper pin box 47 moves upwardly, the pin 51 meets with the resistance of the solenoid 62 which overcomes the coil spring 52 and results in lowering the pin 51 in its pin box. Consequently, when the locking bar 57 is shifted laterally by the cam mechanism 58, the extrusion 54 on the pin will be beneath the projection on the locking bar.

On the other hand, the open electrical circuit which is effected by the projection of the sensing pin 18′ through the card 11 results, through the switchboard and control panel, in de-energizing the corresponding lower solenoid. As a result, when the top pin box 47 moves upwardly, the armature rod 81 of the solenoid offers no resistance to upward movement by the pin 51′ and, when the locking bar 57 is shifted laterally, the extrusion 54′ is in position to be engaged by the projection on the locking bar so that a positive upward movement is thereafter imparted by the pin 51′ to the armature rod 81 of the solenoid. This impulse is then mechanically transmitted through the corresponding Bowen wire of the Bowden wire assembly 49 to ultimately effect a rising of the pin 102 to operate the desired operational mechanism and perform the desired functions.

Inasmuch as mechanical impulses are thus transmitted through solenoids which are not energized, it is necessary to ground those solenoids which are not connected through the control panel to one of the sensing pins so that they will remain inoperative and will not transmit mechanical impulses. This can easily be effected through the control panel by means of a connecting wire 132, Figure 5, which connects an otherwise unconnected solenoid to ground.

Attention is now directed to Figures 1 and 10 for an understanding of the circuit breaker 128. The purpose of the circuit breaker is to provide a safety measure which will limit the time the solenoids are energized to the period necessary for functional requirements and to thus prevent unnecessary overheating.

The circuit breaker comprises a bracket 133 supported upon the tabultor frame and carrying a semi-rigid contact arm 134 and a spring contact arm 136. These contact arms carry contact points 137 and 138 which are normally open but which may be closed to complete the circuit when the spring arm 136 is flexed to the right. A roller 139 is carried at the lower end of the spring arm 136 and is received within a countersunk channel 141 formed in the cam bracket 142 mounted at one end of the top pin box 47. The shape of the channel 141 is such that as the top pin box is raised, the roller 139 and the spring arm 136 are moved to the right to make contact between contacts 137 and 138 to close the circuit. After the locking bar 57 in the top pin box has been shifted so that further movement of the pin box transmits the impulse positively, the electrical portion of the apparatus has served its purpose, and at this time the cam channel 141 permits the roller 139 and the spring arm 136 to return to a position opening the circuit breaker. Consequently, the solenoids are energized no longer than necessary, so that overheating is prevented.

It will also be noted that the shape of the cam channel 141 is such as to insure that the roller will always move clockwise and will never move in a counterclockwise direction as the pin box reciprocates. This is effected by reason of the fact that in the lower position of the pin box the roller 139 is to the right of the upper portion 143 of the channel, while in the uppermost position of the pin box the roller is to the left of the portion 144 of the channel.

*Timing*

Figure 11:
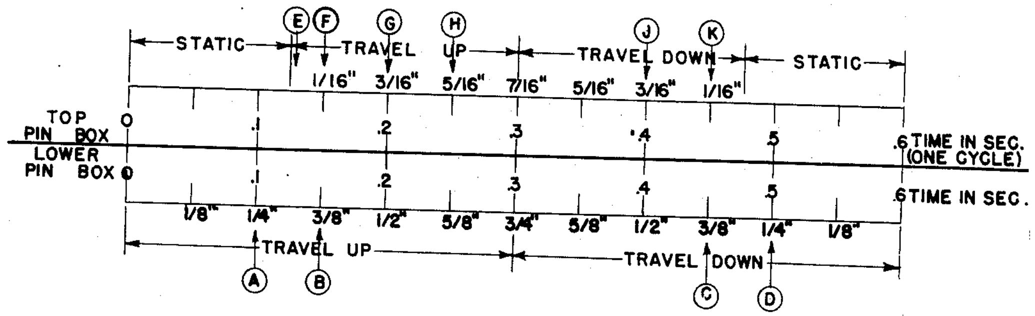
Figure 11 is a graph illustrating one cycle of operation.

With reference to Figure 11, I have illustrated graphically the relationship between the movement of the various parts of the mechanism and the electrical operation. This has been worked out for the particular alphabetic tabulator shown in the drawings, and of course would vary for other machines.

It will be noted that the graph is plotted in time in tenths of seconds from left to right with a total time of .6 second which comprises one complete cycle. During this interval both the lower pin box 13 and the top pin box 47 complete one reciprocation. It will be noted that as the lower pin box 13 travels upwardly a total of three-quarters of an inch in an interval of .3 seconds, the contact between the sensing pin 18 and the contact pin 41 is made at the point A, the locking bar 26 is actuated and the sensing pin 18 meets set pin 32 at point B, and as the lower pin box travels downwardly to complete the cycle the locking bar is returned to its inoperative position at point C, and the electrical contact between the sensing pin and the contact pin broken at point D.

Referring now to the top pin box 47 shown at the upper portion of the graph, it will be noted that the top pin box remains stationary for .125 seconds, then travels upwardly a distance of $\frac{7}{16}$ of an inch by the time a total of .3 seconds has elapsed. The downward travel of the top pin box is in correspondingly reversed relationship.

During the movement of the top pin box, it will be noted that the master circuit breaker 128 is operated at point E to close the circuit breaker, that the pins 51 of the top pin box meet the corresponding solenoid plunger pins at point F, that at point G the locking bar 57 of the top pin box is actuated to thereafter positively lift the pins and at the same time the solenoid plunger pin meets the corresponding Bowden wire pin 98 of the Bowden wire assembly 49, and that subsequently at point H the master circuit breaker 128 opens.

During the other half of the cycle, the locking bar 57 of the top pin box is retracted at point J and the Bowden wire pins 98 reseated simultaneously, and the solenoid plunger pin reseated at point K.

It will be understood of course that the dimensions of the various parts of the mechanism and the clearance between the various pins, solenoid plunger pins, and Bowden wires is predetermined to provide the desired cycle of operation.

From the above description, it will be noted that the present invention achieves the objects mentioned hereinbefore, as well as many other advantages. The principles of this invention can of course be applied to all types of accounting equipment and will prove equally advantageous therewith. It would, for example, eliminate mechanical frailties that now exist in summary punch operations, and there would have to be no definite physical relation between the tabulator and the summary punch as the connection therebetween would be electrical, while the operation would remain mechanical.

*Modification*

Figure 12 indicates a modification of the invention in that the card sensing pin closes the circuit when the sensing pin projects through a hole in the card, subsequently energizing the corresponding solenoid and causing its plunger to rise. Although possibly not as desirable as the previously described form of the invention, since in the modification the plunger would have to overcome inertia and might result in increasing the length of the cycle, nevertheless the modification is practical.

In the drawing, the sensing pin 150 is formed of a non-conducting material and at its lower end engages a spring urged contact member 151 which, when the sensing pin projects through a hole in the punched card completes an electrical circuit to ground through the guide plate 152. Through the switchboard and control panel assembly, illustrated generally at 153, the circuit to the solenoid 154 is completed through the circuit breaker 155, the power supply source 156, and the ground connection 157. The energization of the solenoid lifts the solenoid plunger pin 158 which in turn raises the pin 159 in the pin box 161 against the action of spring 162. Subsequently, the locking bar 163 slides beneath the extrusion 164 upon the pin 159 and thereafter the pin is positively raised. This mechanical impulse is then transmitted through the Bowden wire assembly 165 to the desired operational mechanism.

The term "tabulating equipment" as used in this application refers to all punched card equipment and includes not only alphabetic tabulators of the type shown but also other equipment such as summary punches, etc.

It will be understood that the invention is not to be limited to the exact construction shown and described, but that various changes and modifications may be made without departing from the spirit and scope of the invention, as defined in the appended claims.

What is claimed is:

1. In an interconnection system, mechanically actuated sensing pins for sensing data on punched cards, electrical circuits opened by the projection of the sensing pins through holes in the punched cards and closed when the movement of the sensing pins is arrested by the cards, mechanically actuated pins for initiating impulses for transmittal to operational mechanism, and solenoids in said electrical circuits adapted when energized to resist the movement of the last-named pins.

2. In an interconnection system, a sensing pin box, a plurality of sensing pins mounted for reciprocation in said sensing pin box, a card chamber adjacent said sensing pin box for positioning a punched card, power means for relatively moving said sensing pin box and said card chamber toward each other, a plurality of electrical contact means associated respectively with said sensing pins, said contact means being closed when the movement of the respective sensing pins is arrested by a card in said card chamber, a second pin box including a plurality of pins mounted for reciprocation therein, a plurality of solenoids adapted when energized to resist the movement of said last-named pins, and electrical circuits connecting said contact means and said solenoids.

3. The structure of claim 2 which is further characterized in that a master switch is provided for controlling all of said electrical circuits, said master switch being responsive to the movement of one of said pin boxes to open said electrical circuits for a predetermined interval during each cycle of operation.

4. The structure of claim 2 which is further characterized in that a master switch is provided for controlling all of said electrical circuits, said master switch including cam means and cam follower means, one of said means being mounted upon one of said pin boxes for reciprocation therewith and the other of said means being mounted upon a stationary support, and contact points actuated by the interaction between said cam means and said cam follower means and being separated during a predetermined portion of each cycle and closed during the remainder of each cycle.

5. In an interconnection system, a pin box, a plurality of pins yieldably mounted in said pin box, means for reciprocating said pin box, and a plurality of solenoids mounted adjacent said pin box, said solenoids when energized resisting the movement of certain of said pins.

6. In an interconnection system, a pin box, a plurality of pins yieldably mounted in said pin box, means for reciprocating said pin box, a solenoid box positioned adjacent said pin box, a plurality of solenoids mounted in said solenoid box in alignment with said pins respectively, and movable armature members in said solenoids engageable by said pins for actuation thereby, the armature members of energized solenoids resisting movement by their respective pins.

7. Punched card tabulating equipment comprising a set of sensing pins, means for projecting said sensing pins toward a fixed punched card position, electrical switch means associated with each of said sensing pins, said switch means being responsive to the sensing of a punched card by said sensing pins and closing electrical circuits when the movements of the corresponding sensing pins are arrested by the punched card, a second set of pins, mechanical means for imparting movement to said second set of pins, operational mechanism operated by the movement of said second pins, and electromagnetic means interposed between said second pins and said operational mechanism and energized when said electrical circuits are closed by said switch means to arrest the movement of the corresponding pins in the second set.

8. The structure defined by claim 7 which is further characterized in that said electromagnetic means comprises electric solenoids each having movable armature rods in alignment with the pins in said second set and through which the mechanical impulses may be transmitted to said operational mechanism, said armature rods being held against movement when the solenoids are energized.

9. Punched card tabulating equipment comprising a set of sensing pins, means for projecting said sensing pins toward a fixed punched card position, electrical switch means associated with each of said sensing pins, said switch means being responsive to the sensing of a punched card by said sensing pins and closing electrical circuits when the movements of the corresponding sensing pins are arrested by the punched card, a second set of pins, mechanical means for imparting movement to said second set of pins, a plurality of solenoids in said electrical circuits having movable armatures in alignment with the pins in said second set, a plurality of Bowden wire assemblies each having one end in alignment with the armature of one of said solenoids, and operational mechanism in alignment with the opposite ends of said Bowden wire assemblies.

10. In an interconnection system for transmitting the data represented by holes in a punched card to operational mechanism, a plurality of sensing pins, means for moving said sensing pins toward a card, electrical circuits associated with said sensing pins, means actuated by those pins which do not pass through holes in the card for closing the respective electrical circuits, solenoids in said electrical circuits, a plurality of members associated with said solenoids, means for relatively moving said solenoids and said members toward each other, the energized solenoids representing data not to be transmitted resisting movement of the respective members, and means actuating those of said members which are not resisted by energized solenoids to transmit impulses to operational mechanism.

JOHN K. BROWN.

REFERENCES CITED

The following references are of record in the file of this patent:

UNITED STATES PATENTS

| Number | Name | Date |
| --- | --- | --- |
| 1,978,919 | Tripp | Oct. 30, 1934 |
| 2,111,118 | Lake | Mar. 15, 1938 |